United States Patent
Qi

(10) Patent No.: US 9,534,900 B2
(45) Date of Patent: Jan. 3, 2017

(54) INERTIAL NAVIGATION SCULLING ALGORITHM

(75) Inventor: Honghui Qi, Walnut Creek, CA (US)

(73) Assignee: SYSTRON DONNER INTERIAL, INC., Thousand Oaks, CA (US)

( * ) Notice: Subject to any disclaimer, the term of this patent is extended or adjusted under 35 U.S.C. 154(b) by 460 days.

(21) Appl. No.: 13/985,644

(22) PCT Filed: Feb. 17, 2012

(86) PCT No.: PCT/US2012/025672
§ 371 (c)(1),
(2), (4) Date: Jan. 8, 2014

(87) PCT Pub. No.: WO2012/112908
PCT Pub. Date: Aug. 23, 2012

(65) Prior Publication Data
US 2014/0114569 A1    Apr. 24, 2014

Related U.S. Application Data

(60) Provisional application No. 61/444,108, filed on Feb. 17, 2011.

(51) Int. Cl.
*G01C 21/10*    (2006.01)
*G01C 21/18*    (2006.01)
(Continued)

(52) U.S. Cl.
CPC .............. *G01C 21/18* (2013.01); *G01C 21/16* (2013.01); *G01C 25/005* (2013.01)

(58) Field of Classification Search
CPC ........ G01C 21/18; G01C 21/16; G01C 25/005
(Continued)

(56) References Cited

U.S. PATENT DOCUMENTS

| 5,422,817 A | 6/1995 | Tazartes et al. |
| 5,890,093 A * | 3/1999 | Mark ................ G01C 21/16 701/505 |

(Continued)

FOREIGN PATENT DOCUMENTS

| CN | 101561496 A | 10/2009 |
| CN | 101666650 A | 3/2010 |

OTHER PUBLICATIONS

International Search Report and Written Opinion; PCT/US2012/025672; Dec. 14, 2012.
Savage, P. G. (Apr. 1984). Strapdown System Algorithms, Advances in Strapdown Inertial Systems, Chapter 3, pp. 3.1-3.30. Lecture Series, 133. Retrieved from http://oai.dtic.mil/oai/oai?verb=getRecord&metadataPrefix=html&identifier=ADA143244.

(Continued)

*Primary Examiner* — Redhwan K Mawari
*Assistant Examiner* — Rodney P King
(74) *Attorney, Agent, or Firm* — Hunter Clark PLLC

(57) ABSTRACT

A system for determining a combined velocity rotation compensation and sculling compensation in an inertial navigation system includes: gyroscopes configured to provide a measured angular rotation rate with components from three orthogonal axes; accelerometers configured to provide a measured specific force with components from three orthogonal axes; and a processor configured to calculate a first combined velocity rotation compensation and sculling compensation at a single computational rate, the processor configured to: calculate a first cross product of an instantaneous angular rotation rate and a change in the measured specific force during a first interval; and sum the first cross product with a second cross product of a fraction of the change in the specific force during the second interval and the change in the measured angular rate during the first interval; where the first and second intervals are each one cycle of the single computational rate.

15 Claims, 3 Drawing Sheets

(51) Int. Cl.
*G01C 21/16* (2006.01)
*G01C 25/00* (2006.01)

(58) Field of Classification Search
USPC ....... 701/29.2, 469, 470, 472, 500, 505, 511
See application file for complete search history.

(56) References Cited

U.S. PATENT DOCUMENTS

| | | | |
|---|---|---|---|
| 6,219,616 B1 * | 4/2001 | Litmanovich | G01C 21/16 701/505 |
| 6,876,926 B2 | 4/2005 | Kirkland et al. | |
| 2002/0198656 A1 * | 12/2002 | Ford | G01C 21/165 701/472 |
| 2004/0064252 A1 | 4/2004 | Kirkland et al. | |
| 2008/0071476 A1 | 3/2008 | Hoshizaki | |
| 2009/0254279 A1 | 10/2009 | Han et al. | |

OTHER PUBLICATIONS

Ignagni, M. B. (1998). Duality of Optimal Strapdown Sculling and Coning Compensation Algorithms. Navigation, 45 (2), 85-95.
Savage, P. G. (Mar. 1998). Strapdown Inertial Navigation Integration Algorithm Design Part 2: Velocity and Position Algorithms. Journal of Guidance, Control, and Dynamics, 21(2), 208-221.
International Preliminary Report on Patentability for International Application No. PCT/US2012/025672, dated Aug. 21, 2013, 4 pgs.
State Intellectual Property Office of the P.R.C. (SIPO) 1st Office Action and Search Report for Application No. 201280009199.3 dated May 8, 2015, 5 pgs.
State Intellectual Property Office of the P.R.C. (SIPO) Notification to Grant Patent Right for Invention for Application No. 201280009199.3 dated Oct. 10, 2015, 2 pgs.

* cited by examiner

INERTIAL NAVIGATION SCULLING ALGORITHM

BACKGROUND

Determining location and ground speed in a vehicle is difficult when a point of reference is indeterminable. However, navigation systems now utilize the assistance of global positioning systems for a reference point. In some cases, GPS is unavailable and/or too slow, and the navigation systems are self-reliant. Such systems often utilize a set of gyroscopes to measure the angular velocity and the linear acceleration. This was originally achieved through a motorized gimbal system, using the navigation frame as a set reference frame that is based on the vehicle in which the system is located.

Such a system includes many expensive mechanical parts to ensure proper movement and includes sensors (e.g., accelerometers and gyroscopes) at each of the gimbals for measuring changes in attitude, i.e., where is the orientation of a vehicle in terms of angular parameters of roll, pitch and yaw. Due to the moving parts, gimbaled systems are prone to many error inducing factors, such as gimbal lock, which occurs when two of the gimbals are rotating uniformly in parallel. In addition, bearings and rings of the of the gimbals can stick and/or wear with time. Even more, the bearings are not frictionless, which also causes error in the measurements. When the system experiences errors, it can be removed from the vehicle and recalibrated in very specific conditions before certification for re-use. Accordingly, such a system is only conducive to a very specific market of consumers.

Strapdown inertial navigation systems (SINS) have components that are directly attached to the chassis of the system. The chassis is also secured to the vehicle in which it is located. Accordingly, no parts of the system are mobile. This alleviates error caused by friction and/or faulty components, while also requiring less calibration. Three sensors measure the linear acceleration rate ($a_{SF}^B$) and three sensors measure the angular rotation rate ($\omega_{IB}^B$). A velocity update rate (e.g., m) is an interval utilized to perform calculations on raw measurements taken by the accelerometers and gyroscopes, and incrementally update system parameters (e.g., attitude, velocity, position, etc.) over a specified time period. For example, the update rate can be one system computer clock cycle. The raw measurements are taken rapidly over a time interval, t, and processed by a software solution on a computing device due to the high computation load of the calculations.

The sensors provide raw data relating to the non-gravitational acceleration, or specific force, given in vector form and the data is transformed into a reference frame with respect to the instantaneous vehicle attitude of three orthogonal vector components. The reference frame, B, is vehicle body orientation at a time t equaling to $t_{m-1}$ (i.e., $t=t_{m-1}$), which is the vehicle body orientation measured during a previous update cycle at rate m. For example, the raw measurements are updated at a rate m, so the vehicle body orientation at the present time t is calculated with the raw measurements taken during a prior update cycle (m-1), as the measurements during the present update cycle (i.e., $t=t_m$) are being taken and calculated for the vehicle body orientation in relation to the original reference frame B. Each movement detected in the system is calculated based on the present vehicle body orientation in relation to the orientation during the prior reference frame B. The three orthogonal vector components of the raw measurements provided by the sensors are given in a set of direction cosines, or quarternions which describe the spatial orientation and movement of the vehicle in terms of roll, pitch and direction. P. G. Savage, "Strapdown Inertial Navigation Integration Algorithm Design Part 2: Velocity and Position Algorithms" *Journal of Guidance, Control, and Dynamics*, vol 21, No. 2, 1998, pp. 208-221; and "Strapdown System Algorithms" *Advances in Strapdown Inertial Systems*, NATO AGARD Lecture Series No. 133, May 1984, represents the velocity algorithm in the strapdown system in analytical form as:

$$\Delta v_{SF_m}^{B_{m-1}} = \int_{t_{m-1}}^{t_m} C_{B_m}^{B_{m-1}} a_{SF}^B dt = \int_{t_m}^{t_{m-1}} \left[ I + \frac{\sin|\phi(t)|}{|\phi(t)|}(\phi(t)\times) + \frac{1-\cos(\phi(t))}{|\phi(t)|^2}(\phi(t)\times)^2 \right] a_{SF}^B dt \quad (1)$$

where: $\Delta v_{SF_m}^{B_{m-1}}$ i is velocity change over a time interval $t_{m-1}$ to $t_m$ caused by a specific force (SF) in a body coordinate frame $B_{m-1}$;

$B_{m-1}$ is the body coordinate frame $B_m$ with axes parallel to nominal right handed orthogonal sensor input axes at time $t_{m-1}$;

$a_{SF}^B$ is the accelerometer measured specific force (SF) in the body coordinate frame $B_{m-1}$;

$C_{B_m}^{B_{m-1}}$ is the direction cosine matrix from body coordinate frame $B_m$ to $B_{m-1}$; and $\phi(t)$ is a rotation vector which defines the general orientation of frame $B_m$ relative to frame $B_{m-1}$ at a time greater than $t_{m-1}$:

Equation 1 is approximated to a first order to:

$$\Delta v_{SF_m}^{B_{m-1}} = v_m + \frac{1}{2}\alpha_m \times v_m + \frac{1}{2}\int_{t_{m-1}}^{t_m} (\alpha(t) \times a_{SF}^B + v(t) \times \omega_{IB}^B) dt, \quad (4)$$

Where:

$$v(t) = \int_{t_{m-1}}^{t_m} a_{SF}^B d\tau, \, v(m) = v(t=t_m) \quad (5)$$

$\omega_{IB}^B$ is the measured angular rotation rate provided by the gyroscopes.

Further expansion of the cross product yields:

$$\Delta v_{SF_m}^{B_{m-1}} = \int_{t_{m-1}}^{t_m} [I + (\alpha(t)\times)] a_{SF}^B dt \quad (2)$$

where:

$$\alpha(t) = \int_{t_{m-1}}^{t} \omega_{IB}^B d\tau, \, \alpha(m) = \alpha(t=t_m); \text{ and} \quad (3)$$

After these components are transformed into a coordinate reference frame (e.g., B) through the direction cosine matrix $C_{B_m}^{B_{m-1}}$, a resultant non-gravitational acceleration in terms of the reference frame is yielded. The integration of the resultant non-gravitational acceleration reflects the change in the spatial orientation and movement of the vehicle from its original position. Accordingly, by calculating the difference from the known original attitude, position and speed, the current attitude, position and speed is determined.

Specifically, to compute the approximate speed of a vehicle, the error in the system can also be factored into the overall measurements. The error is represented by the third term of equation (4). This error is known as the sculling error, or compensation, and it can be used to aid in maintaining velocity accuracy in a highly dynamic environment. Accordingly, equation (4) is simplified as:

$$\Delta v_{SF}^{B_{m-1}} = v_m + \Delta v_{rot_m} + \Delta v_{scal_m} = v_m + \Delta v_{rot/scul_m}, \quad (6)$$

where: $\Delta v_{rot_m}$ is the velocity rotation compensation, or a change in the velocity due to rotational movement of the vehicle at update cycle m; and $\Delta v_{scul_m}$ is the sculling compensation, or a change in the velocity due to sculling movement of the vehicle at update cycle m.

A sculling error is a result of the apparent and constant acceleration experienced by the SINS, which is often caused by vibrations and other factors causing sensor errors. The sculling error is periodic in nature and, thus, can be miscalculated if the measurements in transform functions are erroneous.

The aforementioned known method for computing the measured accelerations and rotations in the art is disclosed by P. G. Savage, "Strapdown Inertial Navigation Integration Algorithm Design Part 2: Velocity and Position Algorithms" *Journal of Guidance, Control, and Dynamics*, vol 21, No. 2, 1998, pp. 208-221; and "Strapdown System Algorithms" Advances in Strapdown Inertial Systems, NATO AGARD Lecture Series No. 133, May 1984. Savage further provides two analytical forms to describe the velocity and sculling compensation of equation 6. The two analytical forms properly account for a sculling compensation within the calculation of the overall change in velocity $\Delta v_{SF}^{B_{m-1}}$ of a strapdown system. The calculation of the two analytical forms can be implemented in software. A first analytical form provides a singular term representing a velocity rotation compensation, which is a cross product of the integral of change in the angular rotation rate (i.e., angular acceleration) at cycle m and the integral of the change in the linear acceleration rate (i.e., velocity) of the body at cycle m:

$$\Delta v_{rot_m} = \tfrac{1}{2} \alpha_m \times v_m \quad (7)$$

A second analytical form provides two terms describing the sculling compensation in the form of integrals, the calculations of which are based on the velocity rotation compensation. In both analytical forms, the velocity compensation is calculated at the velocity update sampling rate, or cycle rate (e.g., 50 Hz) as it aids in determining the velocity update. However, Savage discusses that in the second analytical form, having two terms, the sculling compensation is integrated at a different rate (e.g., l), which is preferably a faster cycle rate than the velocity update rate m. Accordingly, the sculling error may then be computed and updated several times during a velocity update rate interval. Savage represents this computation as a digital recursive algorithm for the sculling compensation terms in the following analytical form:

$$\Delta \alpha_l = \int_{t_{l-1}}^{t_l} \omega_{IB}^B dt, \; \alpha_l = \alpha_{l-1} + \Delta \alpha_l, \; \alpha_m = \alpha_l (t_l = t_m), \quad (8)$$

$\alpha_l = 0$ at $t = t_{m-1}$ $$\Delta v_l = \int_{t_{l-1}}^{t_l} a_{SF}^B dt, \; v_l = v_{l-1} + \Delta v_l, \; v_m = v_l (t_l = t_m), \quad (9)$$

$v_l = 0$ at $t = t_{m-1}$

-continued $$\delta v_{scul_l} = \tfrac{1}{2} \left[ \left( \alpha_{l-1} + \tfrac{1}{6} \Delta \alpha_{l-1} \right) \times \Delta v_l + \left( v_{l-1} + \tfrac{1}{6} \Delta v_{l-1} \right) \times \Delta \alpha_l \right] \quad (10)$$

$\Delta v_{scul_l} = \Delta v_{scul_{l-1}} + \delta v_{scul_l}, \; \Delta v_{scul_m} = \Delta v_{scul_l}(t = t_m),$ $\Delta v_{scul_l} = 0$ at $t = t_{m-1}$ Accordingly, this method relies on two computational rates (m, l) at which the system's raw measurements are calculated. Having these two rates greatly increase the computational load of the system compared to a system calculated at just the velocity update rate because with two cycle rates the raw measurements must be separately calculated and the combined.

In another approach to more accurately calculate the sculling error within a system, M. B. Ignagni "Duality of Optimal Strapdown Sculling and Coning Compensation Algorithms" *Journal of the Institute of Navigation*, Vol. 45, No.2, 1998, pp. 85-95, discusses a method of utilizing coefficients in a set of algorithms. These coefficient algorithms are utilized to factor the system's inherent errors, such as system platform vibrations, in different system environments. Accordingly, Ignagni discusses a specific set of coefficient algorithms to address each of these problems. The coefficient algorithms correspond to defined ratios of fast and slow rates. Due to the specific nature of these coefficients, not all ratios of fast and slow rates are possible. For instance, ratios such as l/m=7 or l/m>10 are not computationally possible with the method provided by Ignagni. Additionally, the technique provided by Ignagni does not improve upon the large computational load of the technique discussed in Savage.

Calculating an incorrect sculling compensation during even one interval (e.g., system clock cycle) can be detrimental to an inertial navigation system, as the algorithm is recursive and prior calculations provide the basis for the proximate calculations (see, equations 8-10). Slight offsets in the system and consequent miscalculations may trigger faulty readings. Several techniques, such as those by Savage and Ignagni, have been developed to account for these defects within the system in order for a proper sculling compensation, or error, to be calculated and removed from the raw measurements taken by the system. These calculations add to the processing load, which inherently adds to the system size (i.e., larger processor). However, both an increased load and system size are undesirable in a navigation system.

SUMMARY

An example of a system for determining a combined velocity rotation compensation and sculling compensation in an inertial navigation system includes: a set of gyroscopes configured to measure angular rotation rates and to provide a measured angular rotation rate with components from three orthogonal axes; a set of accelerometers configured to measure specific forces and to provide a measured specific force with components from three orthogonal axes; and a processor coupled to the set of gyroscopes and the set of accelerometers and configured to calculate a first combined velocity rotation compensation and sculling compensation at a single computational rate, the processor configured to: calculate a first cross product that is a cross product of an instantaneous angular rotation rate and a change in the measured specific force during a first interval, where the instantaneous angular rotation rate is a sum of the measured angular rotation rates during a second interval prior to the first interval, a fraction of a change in the measured angular rotation rate during the first interval, and a fraction of a change in the measured angular rotation rate during the second interval;

and sum the first cross product with a second cross product that is a cross product of a fraction of the change in the specific force during the second interval and the change in the measured angular rate during the first interval; where each of the first interval and the second interval is one cycle of the single computational rate.

Implementations of such a system may include one or more of the following features. The velocity rotation compensation has both an initial angular rotation rate and a specific force equaling zero. The processor is further configured to determine a velocity change due to the combined velocity rotation compensation and the sculling compensation at the first interval, where the velocity change is equal to the sum of the first combined velocity rotation compensation and sculling compensation with a change in the velocity rotation and a second combined velocity rotation compensation and sculling compensation, where the second combined velocity rotation compensation and sculling compensation is calculated using data from the second interval and a third interval, and where the third interval is prior to the second interval. The processor is further configured to: calculate a change in a velocity of the inertial navigation system as a sum of a calculated system velocity during a first computer clock cycle rate and the change in the velocity rotation and sculling compensation at the first interval. The single computational rate is faster than a computer clock cycle rate. The velocity rotation compensation is the product of one-half of a sum of a third cross product of the measured angular rotation rate during the first interval and the measured specific force during the first interval minus a fourth cross product of the measured angular rotation rate during the second interval and the measured specific force during the second interval, wherein the summation is calculated over a number of subintervals defined by a fraction of the single computational rate over the computer clock cycle rate. The combined velocity rotation compensation and sculling compensation is analytically represented by by $(\alpha_{l-1} + \frac{1}{2}\Delta\alpha_l + \frac{1}{12}\Delta\alpha_{l-1}) \times \Delta v_l + \frac{1}{12}\Delta v_{l-1} \times \Delta\alpha_l$, wherein $\alpha_{l-1}$ is the measured angular rotation rate during a second interval prior to the first interval, $\Delta\alpha_l$ is a change in the measured angular rotation rate during the second interval, $\Delta\alpha_{l-1}$ is the change in the measured angular rotation rate during the second interval, $\Delta v_l$ is the change in the measured specific force during the first interval, and $\Delta v_{l-1}$ is the change in the measured specific force during the second interval.

An example of an apparatus for calculating a combined velocity rotation compensation and sculling compensation in an inertial navigation system at a single computational rate includes: first measuring means for measuring angular rotation rates about and to provide a measured angular rotation rate with components from three orthogonal axes; second measuring means for measuring specific forces and to provide a measured specific force with components from three orthogonal axes; and processing means for calculating a sum of a velocity rotation compensation and a sculling compensation, where the sum is of: a first cross product of an instantaneous angular rotation rate and a change in the measured specific force over a first interval, wherein the instantaneous angular rotation rate is a sum of the measured angular rotation rates during a second interval prior to the first interval, a fraction of a change in the measured angular rotation rate during the second interval, and a fraction of a change in the measured angular rotation rate during the first interval; and a second cross product of a fraction of the change in the specific force over the second interval and the change in the measured angular rate during the first interval.

Implementations of such an apparatus may include one or more of the following features. Each of the first interval and the second interval is one cycle of the single computational rate. The single computational rate is faster than a computer clock cycle rate. The velocity rotation compensation is the product of one half times a summation of a third cross product of the measured angular rotation rate during the first interval and the measured specific force during the first interval minus a fourth cross product of the measured angular rotation rate during the second interval and the measured specific force during the second interval, wherein the summation is calculated over a number of subintervals defined by a fraction of the single computational rate over the computer clock cycle rate.

An example of a non-transitory processor-readable medium includes instructions configured to cause a processor to: calculate a first cross product of an instantaneous angular rotation rate and a change in a measured specific force over a first interval, wherein the instantaneous angular rotation rate is a sum of a measured angular rotation rate during a second interval prior to the first interval, a fraction of a change in the measured angular rotation rate during the second interval, and a fraction of a change in the measured angular rotation rate during the first interval; sum the first cross product with a second cross product of a fraction of the change in the specific force over the second interval and the change in the measured angular rate during the first interval; and compute the first cross product and the second cross product at a single computational rate, where each of the first interval and the second interval is one cycle of the single computational rate; where the measured angular rotation rate is provided by a set of gyroscopes coupled to the processor and configured to measure angular rotation rates with components from three orthogonal axes; and where the measured specific force is provided by a set of accelerometers coupled to the processor and configured to measure specific forces with components from three orthogonal axes.

DETAILED DESCRIPTION

Finding both an efficient and accurate approach to compensate for sculling error while also decreasing the computational load and processing time from the known techniques, such as Savage and Ignagni, is desirable. To eliminate the additional computational load of two sampling frequencies discussed within Savage, it has been discovered that calculating both the velocity and sculling compensation at a fast rate greatly reduces the computational load of calculating the overall change in velocity $\Delta v_{SF}^{B_{m-1}}$ of the system, while still providing the same, if not more, accurate results compared with the prior techniques. The velocity is updated at a corrected rate that is the same rate as the sculling compensation, reducing and possibly eliminating calculations on intermediate data from the sculling compensation. This new approach is accomplished through expansion of the velocity rotation compensation term (see, equation 7) to formulate an analytical equation of the velocity rotation compensation in terms of a fast rate. After some derivation, the velocity rotation compensation and sculling compensation can be combined to form an algorithm in terms of only the fast rate. Processing these compensations at a singular rate can reduce computational load of the system reduce memory requirements (i.e., for intermediate sculling compensation data), and reduce the system size. For example, the computational load provided in the new approach may provide a computational load equal to or less than the computational load of only the sculling compensation known in the art, such as Savage.

Figure 1:
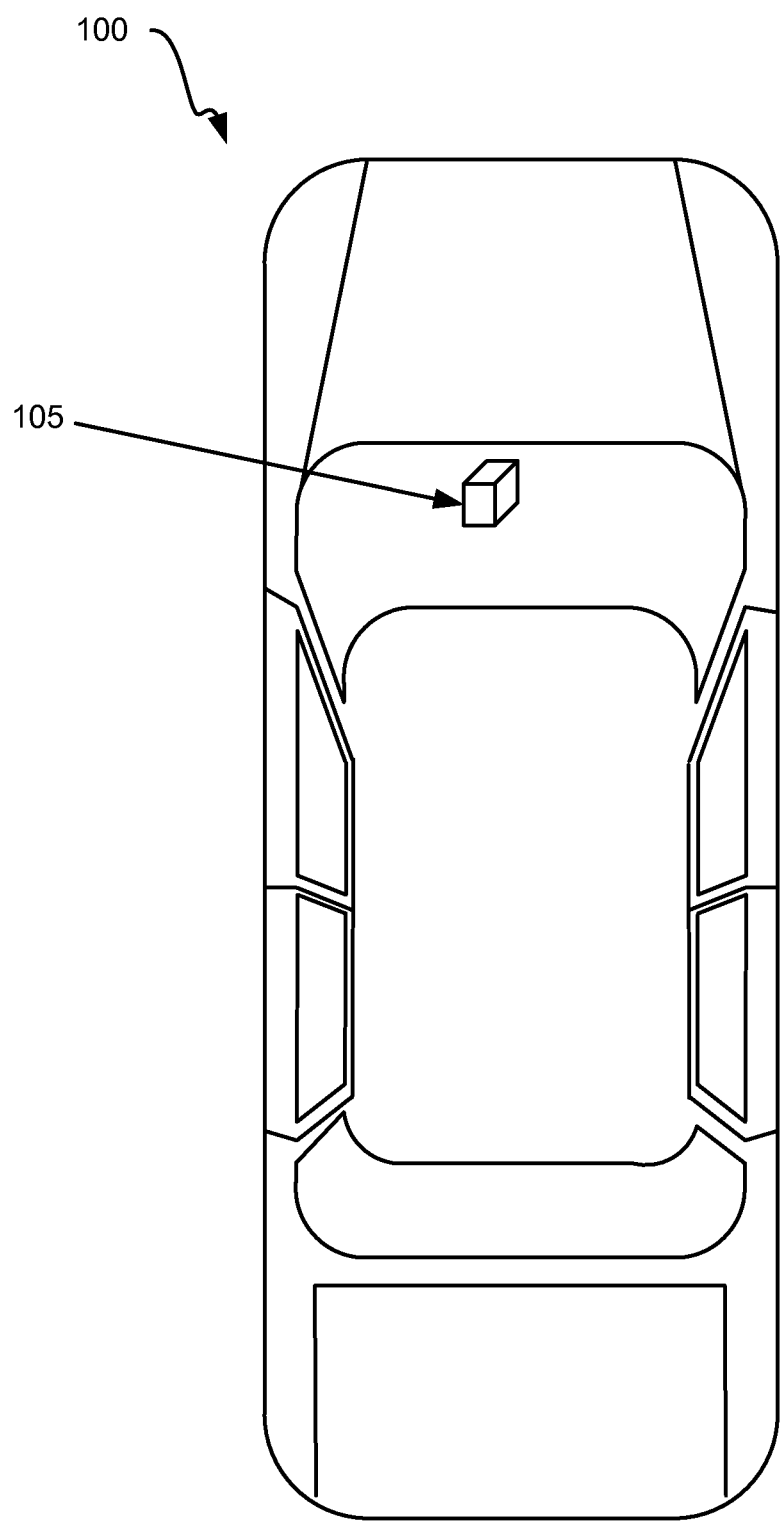
FIG. 1 is a simplified diagram of a vehicle including an inertial navigation system.

Referring now to FIG. 1, a vehicle 100 includes an inertial navigation system 105. The navigation system 105 is preferably small and compact and located in the vehicle 100. Some examples of vehicles include an airplane, an automobile, or a missile. The system 105 may include a housing to decrease the influence of outside factors which may affect the collection of data within the system 105. Some of these outside factors may include extreme temperatures, wind, vibrations or debris. To accurately measure movements (i.e., specific forces) on the vehicle 100, the system 105 may be affixed to the vehicle 100 and calibrated level to the ground.

The vehicle 100 provides a reference frame from which the system 105 calculates position, attitude and velocity. The reference frame, B, is defined by the current attitude, position and velocity of the vehicle 100 in relation to a previous attitude, position and velocity of the vehicle 105. The reference frame B is calculated with initial axes being parallel to the axes of the navigation system 100. As the vehicle 100 moves a distance over a period of time, an instantaneous specific force, measured by the accelerometers, is felt by the system 105 and mapped to a direction cosine matrix of the reference frame B of the system 105. An instantaneous attitude of the system 105 in the reference frame B is integrated over a period of time, such as one computer cycle, to provide a velocity change in the system 105.

As previously discussed, the computation of the velocity change in an inertial navigation system utilizes recursive calculation methods. Each measurement is taken, transformed and integrated in the system. Slight errors experienced by the system are also factored into the output. This output is utilized to calculate the next location, velocity, and position of the system. Accordingly, the more the error can be reduced prior to the calculation and integration of the proximate measurements, the less error will be experienced in the output of the system.

Figure 2:
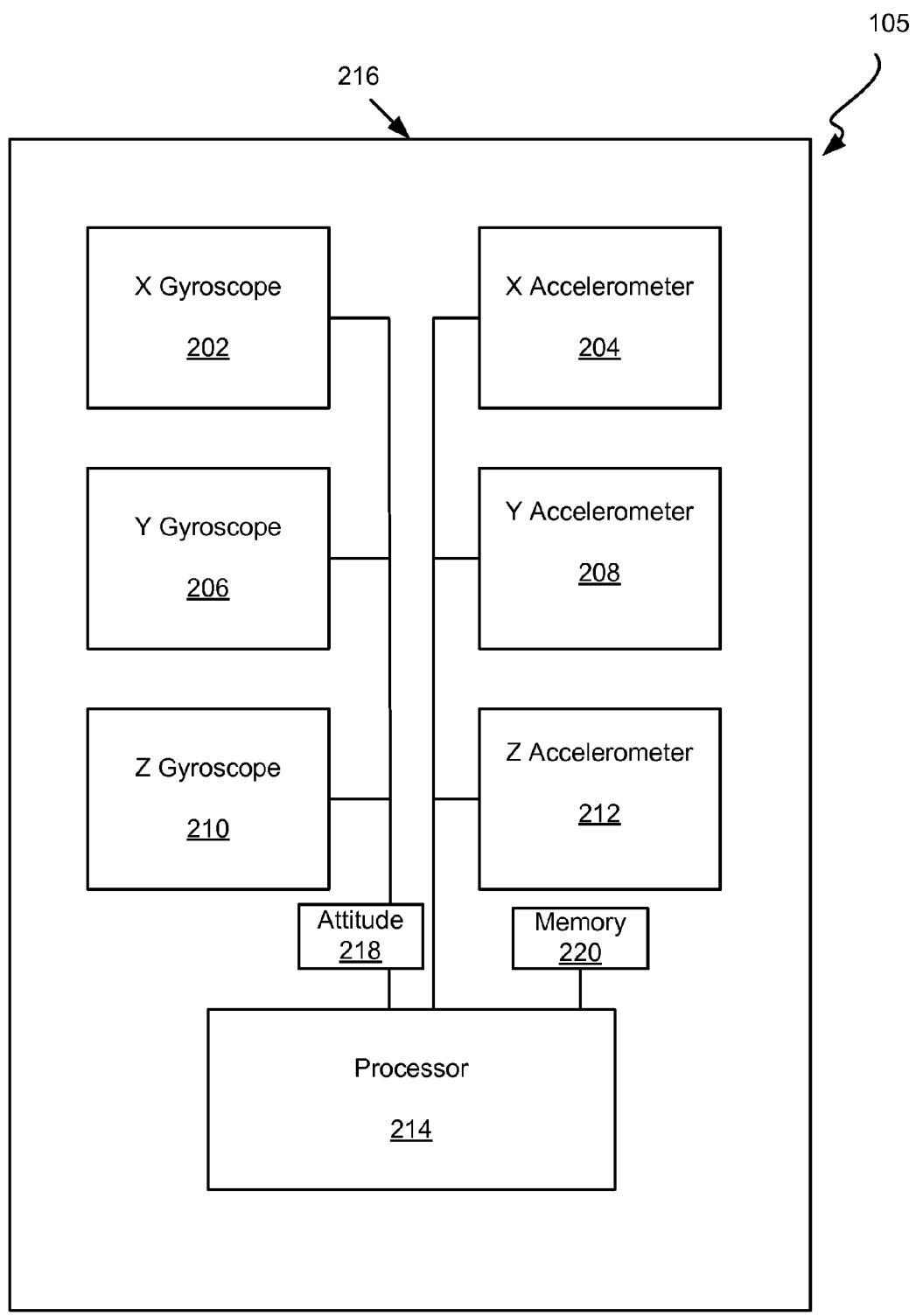
FIG. 2 is a block diagram of components of an inertial navigation system.

Referring also to FIG. 2 the system 105 includes three gyroscopes 202, 206, 210, located on three orthogonal axes and three accelerometers 204, 208, 212, located on three orthogonal axes. Though three gyroscopes and three accelerometers are shown more than three of either may be utilized. Each gyroscope is a sensor that provides an angular rate $\omega_{IB}^{B}$, or rate of rotation, about an axis in the form of a vector defined with reference to the reference frame B. In inertial systems, the three orthogonal axes may be referred to as roll, pitch and yaw (i.e., heading or azimuth). Accordingly, each of the gyroscopes 202, 206, 210 provides measurements on an axis relating to the roll, pitch or yaw. These measurements aid in determining the orientation of the vehicle 100.

The angular rate measured by the gyroscopes 202, 206, 210 on the axe is transformed into vectors which provide an instantaneous attitude 218 of the vehicle in the reference frame B. The attitude 218 is the orientation of the vehicle in a reference frame. Analytically, the attitude 218 is implicit in the cosine matrix of equation (1).

(See, equations (1)-(3)). Transforming the three orthogonal axes measurements from the gyroscopes 202, 206, 210 into the navigational reference frame provides the instantaneous vehicle attitude 218. The attitude 218 can be calculated in a separate module, which can compute the analytical transformation of the raw data measurements from the gyroscopes 202, 206, 210 into the navigational reference frame. The attitude 218 is described in terms of the reference frame B, which is a reference frame defined by the vehicle attitude at a prior time interval. Integrating the resultant reference with the non-gravitational acceleration from the accelerometers 204, 208, 212 provides the overall velocity change in the system. (Equation (1)).

Each of the accelerometers 204, 208, 212 is a sensor that provides a vector form of the vehicle linear non-gravitational acceleration in the inertial reference frame. The resultant vector is referred to as the specific force experienced by the system 105, as acceleration provides a directional force. Miscalculations in the specific force are often caused by vibrations in the system platform. Integrating the measured specific force from the accelerometers over a computer clock cycle in the reference frame B determines the velocity of the system 105 at a specific time t in an angular direction. The angular direction, or orientation, is determined by the transformation of each the three gyroscope-measured angular-rate vectors into the reference frame B. However, because the system 105 is strapped down, or affixed to the vehicle 100 in which it is located, the gyroscopes 202, 206, 210 will vibrate due to vehicle movement and then these computations may be skewed. To provide improved accuracy, error analysis is performed on the measurements in the aforementioned form of the sculling and velocity compensation. If this error analysis is performed at a fast sampling rate, the measured data is corrected more often, improving the measured acceleration resolution and thereby improving the calculated velocity and position of the vehicle.

The system 105 also includes a processor 214 and memory 220. The processor 214 is preferably an intelligent device, e.g., a personal computer central processing unit (CPU) such as those made by Intel® Corporation or AMD®, a microcontroller, an application specific integrated circuit (ASIC), etc. The memory 220 includes random access memory (RAM) and read-only memory (ROM). The disk drives 36 include a hard-disk drive, a CD-ROM drive, and/or a zip drive, and may include other forms of drives. The system 105 stores, e.g., in the memory 220, processor-readable, processor-executable software code containing instructions for controlling the processor 214 to perform functions described below. The software can be loaded onto the memory 220 by being downloaded via a network connection, uploaded from a disk, etc. Further, the software may not be directly executable, e.g., requiring compiling before execution.

To calculate the velocity compensation component at a faster cycle rate, an algorithm has been derived as an alternative to equation (6) and stored as computer readable code in the memory 105 of the inertial navigation system 105. This newly derived algorithm can be combined with the sculling compensation and computed by the processor 214 to determine the overall change in the velocity of the system 105 over a period of time, such as one computer clock cycle. The algorithm provides that the velocity compensation is the difference between a cross product of the acceleration and velocity during a first cycle (present), l, and a cross product of the acceleration and velocity at a second cycle (prior to the first), l−1. The difference between these two cross products is summed over a set of intervals (e.g., 1 to M). The summation can be analytically expressed in an expansion that is described through a known relation of the faster cycle rate to the slower cycle rate (e.g., the computer clock cycle rate). The relationship between the fast cycle rate and the slow cycle rate can be defined as M=l/m. Accordingly, the new analytical equations of the velocity compensation at the fast cycle rate becomes:

$$\Delta v_{rot_m} = \frac{1}{2}\alpha_m \times v_m = \frac{1}{2}\sum_{l=1}^{l=M}[\alpha_l \times v_l - \alpha_{l-1} \times v_{l-1}] \quad (11)$$

where: M=l/m and is the number of subintervals within $t_{m-1}$ and $t_m$; and $t_{m-1}$ is the time at a previous clock cycle, m−1; and
$t_m$ is the time at the current clock cycle m.

The value m may be equal to one computer clock cycle, which is slower than a selected fast cycle rate l. For example, the computer processor (e.g., clock) can run at 60 Hertz (Hz) and the fast rate l can be selected at 120 Hz, which would allow for two computations to occur during one clock cycle. This fast cycle rate l can be utilized to compute the overall compensated error. An expansion of the summation in equation (11) provides cancelation of all terms except for a first term $\alpha_0, v_0$, and a last term $\alpha_l \times v_l - \alpha_{l-1} \times v_{l-1}$. The first term is equal to zero, as no initial acceleration or velocity is felt by the system 105 and a zero velocity is used to update the system 105. The last term may be substituted with the acceleration and velocity at the fast cycle rate l, previously defined in equations (8) and (9):

$$\alpha_l = \alpha_{l-1} + \Delta\alpha_l \quad (8)$$

$$v_l = v_{l-1} + \Delta v_l \quad (9)$$

Equations (8) and (9) provide that the acceleration and velocity during a first cycle (present) may be defined as the acceleration and velocity at a second cycle (prior to the first) plus any change in the acceleration, $\Delta\alpha$, and velocity, $\Delta v$, experienced during the first cycle. The substitution of equations (8) and (9) into expanded equation (11) allows for the change in acceleration ($\Delta\alpha$) and change in velocity ($\Delta v$) to be considered at an interval of the fast cycle rate l. The velocity rotation compensation at the fast cycle rate l can be analytically represented as:

$$\Delta v_{rot_m} = \frac{1}{2}\sum_{l=1}^{l=M}(\alpha_{l-1} \times \Delta v_l - v_{l-1} \times \Delta\alpha_l + \Delta\alpha_l \times \Delta v_l) = \sum_{l=1}^{l=M}\delta v_{rot_l} \quad (12)$$

$$\text{where, } \delta v_{rot_l} = \frac{1}{2}(\alpha_{l-1} \times \Delta v_l - v_{l-1} \times \Delta\alpha_l + \Delta\alpha_l \times \Delta v_l) \quad (13)$$

The velocity rotation compensation (e.g., equation (13)) and the sculling compensation (e.g., equation (10)) may be calculated at the same rate l. By calculating both equations (10) and (12) at a fast rate, small changes in the system 105 can be detected. Accordingly, when the next calculation is performed, these changes can be properly accounted for and compensated for in order to provide accurate inertial readings for the vehicle 100. Though the calculations are being performed at a faster rate with more overall system calculations being performed, the computational load of the system is significantly decreased compared to prior systems, such as those discussed in Ignagni and Savage. In these prior algorithms, each of the rotation and sculling compensations are not only separately calculated, but calculated at different rates. For example, these prior algorithms 1) perform one computation at a fast rate, 2) store the calculated results at the fast rate, 3) perform a different computation at a slow rate and then 4) factor the stored results into a calculation performed at the slow rate. Accordingly, the computational load of these systems is high.

By eliminating the intermediary data processing of the sculling compensation data at a fast rate (i.e., steps 2-4), the computational load decreases. The load of the system can then be comparable to the load of just one compensation term (i.e., sculling or velocity) discussed in the prior art (i.e., step 1). It has been found that the velocity and sculling terms can be calculated at a single, fast cycle rate according to the following analytical equation:

$$\delta v_{rot/scul_l} = \delta v_{rot_l} + \delta_{scul_l} = (\alpha_{l-1} + \frac{1}{2}\Delta\alpha_l + \frac{1}{12}\Delta\alpha_{l-1}) \times \Delta v_l + \frac{1}{12}\Delta v_{l-1} \times \alpha_l \Delta v_{rot/scull} = \Delta v_{rot/scul_{l-1}} + \delta v_{rot/scul_l}$$
$$\Delta v_{rot/scul_m} = \Delta v_{rot/scul_l}(t=t_m), \Delta v_{rot/scul_l} = 0 \text{ at } t=t_{m-1} \quad (14)$$

This algorithm may be digitally processed to calculate the incremental changes in the velocity due to the rotation of the vehicle in which the system is located.

The final velocity change in a time interval t of the inertial navigation system 105 may be analytically represented as:

$$\Delta v_{SF_b}^{B_{m-1}} = v_m + \Delta v_{rot/scul_m} \quad (15)$$

The analytical equation 15 calculated at a single computation at a fast rate l during one computer cycle m can provide the change in velocity of the system 105, which accurately accounts for sculling error and decreases the computational load.

Figure 3:
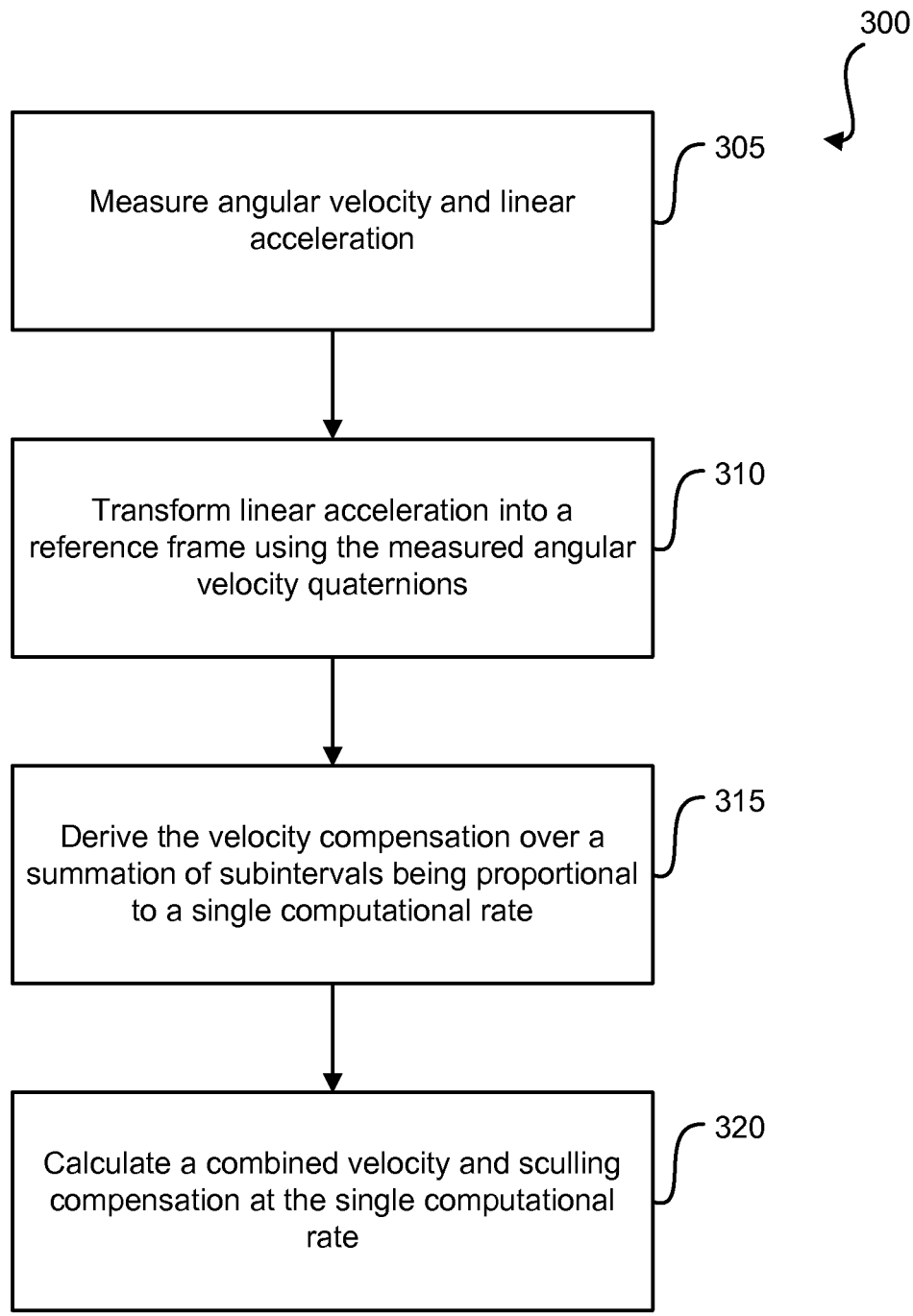
FIG. 3 is a flowchart of a process of utilizing an inertial navigation system to determine a velocity change in a vehicle.

Referring now to FIG. 3, with further reference to FIGS. 1-2, a method 300 for determining velocity and sculling compensation at a single computational rate includes the stages shown. The method 300 uses recursive processing to determine current data. The method 300 computes a first set of data at a time $t_{m-1}$, which is a time t at a previous clock cycle m−1. The method 300 computes the integral of the measurements over a time $t_m$ which is a time t at the current clock cycle m. The sculling and velocity compensation measurements are computed at a sampling cycle rate of l, which is faster than the computer clock cycle, which may also be referred to as the update cycle, m.

In stage 305, the accelerometers 204, 208, 212 and gyroscopes 202, 206, 210 within an inertial navigation system provide raw measurements of linear acceleration rate $\alpha_{SF}^B$ and angular rotation rate $\omega_{IB}^B$, respectively, over a time interval. The raw measurements are provided in vector form and taken from three orthogonal axes. The raw measurements are sent to the processor 214 in the system 105 where code, stored in the memory 220, is utilized in conjunction with the processor 214 to perform calculations on the raw measurements. For example, the gyroscope angular rotation rate $\omega_{IB}^B$ vectors are sent to the processor 214 to determine the instantaneous attitude 218 of the vehicle 100 and define a navigational reference frame B. The reference frame is defined through a direction cosine matrix (see, equation (1)), which computes the instantaneous vehicle attitude 218 through a rotation vector defining the general orientation of reference frame B relative to the previous reference frame $B_{m-}$(i.e., the reference frame of the vehicle 100 at a prior computer clock cycle).

In stage 310, utilizing the navigation reference frame B as defined through the direction cosine matrix, the linear acceleration $\alpha_{SF}^{B}$, vectors are transformed into the same reference frame. This transformation is accomplished through integrating the vector cross product of the instantaneous vehicle attitude 218 with the specific force $\alpha_{SF}^{B}$, or linear acceleration. The cross product may be approximated to a first order to further reduce the computational load. (See, equation 2). However, additional approximations can be utilized if greater accuracy is required by the system. The first order approximation of the cross-product equals a sum of the system velocity at a current computer clock cycle (e.g., slow rate, m), the velocity rotation compensation and the sculling compensation. Accordingly, the overall change in the system 105 velocity may be defined as the system 105 velocity at the current cycle summed with the change in the combined velocity and sculling compensation. The sculling compensation may be further defined in a digital recursive algorithm and computed at a fast computational rate, l. (See, equations 8-10).

In stage 315, the velocity compensation is derived through the expansion of the velocity rotation compensation term, also defined at the fast rate l. The expansion of the velocity rotation compensation term is accomplished through relating the fast computation rate to the slow computational rate (M=l/m) and summing the subintervals of the changes in velocity at fast computational rate (see, equations (12)-(13)). The velocity rotation compensation is analytically represented at a fast computational rate (see, equation (12)) and combined with the sculling compensation at the fast computational rate (see, equation (10)) to provide a combined velocity rotation and sculling compensation algorithm, which can be computed at a singular rate.

In stage 320, the combined velocity rotation and sculling compensations are calculated at the single, fast computation rate l. The combined compensation algorithm is then utilized to determine the velocity change in the system over a specified time interval $\Delta v_{SFm}^{B_{m-1}}$, such as one computer clock cycle. The algorithm may be computed at any number of subintervals l during a slow cycle rate m, such as a system clock cycle. In further embodiments, the algorithm may be expanded to include higher order components, providing additional computation and accuracy as reflected in additional terms for equation (1). For example, a second term is defined within the algorithm through substitution of $$\frac{\sin|\phi(t)|}{|\phi(t)|}(\phi(t))$$

for $\alpha(t)$ in equation 14. A third term is additionally defined through substitution of $$\frac{1-\cos(\phi(t))}{|\phi(t)|^2}(\phi(t)\times)^2$$

for $\alpha(t)$ in equation 14.

Other embodiments are within the scope and spirit of the appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, "or" as used in a list of items prefaced by "at least one of indicates a disjunctive list such that, for example, a list of "at least one of A, B, or C" means A or B or C or AB or AC or BC or ABC (i.e., A and B and C).

Further, more than one invention may be disclosed.

What is claimed is:

1. A system for compensating for sculling error in an inertial navigation system, the system comprising:
    a set of gyroscopes configured to measure angular rotation rates and to provide a measured angular rotation rate with components from three orthogonal axes;
    a set of accelerometers configured to measure specific forces and to provide a measured specific force with components from three orthogonal axes; and
    a processor coupled to the set of gyroscopes and the set of accelerometers and configured to compensate for the sculling error by calculating a first combined velocity a first combined velocity rotation compensation and sculling compensation at a single computational rate, the processor configured to:
        calculate a first cross product that is a cross product of an instantaneous angular rotation rate and a change in the measured specific force during a first interval, wherein the instantaneous angular rotation rate is a sum of the measured angular rotation rates during a second interval prior to the first interval, a fraction of a change in the measured angular rotation rate during the first interval, and a fraction of a change in the measured angular rotation rate during the second interval; and
        sum the first cross product with a second cross product that is a cross product of a fraction of the change in the specific force during the second interval and the change in the measured angular rate during the first interval,
        wherein each of the first interval and the second interval is one cycle of the single computational rate; and
        wherein the velocity rotation compensation is a change in velocity due to rotational movement of the inertial navigation system and the sculling compensation is a change in velocity due to sculling movement of the inertial navigation system.

2. The system of claim 1 wherein the velocity rotation compensation has both an initial angular rotation rate and a specific force equaling zero.

3. The system of claim 1 wherein the processor is further configured to:
    determine a velocity change due to the combined velocity rotation compensation and the sculling compensation at the first interval;
    wherein the velocity change is equal to the sum of the first combined velocity rotation compensation and sculling compensation with a change in the velocity rotation and a second combined velocity rotation compensation and sculling compensation;
    wherein the second combined velocity rotation compensation and sculling compensation is calculated using data from the second interval and a third interval; and
    wherein the third interval is prior to the second interval.

4. The system of claim 3 wherein the processor is further configured to: calculate a change in a velocity of the inertial navigation system as a sum of a calculated system velocity during a first computer clock cycle rate and the change in the velocity rotation and sculling compensation at the first interval.

5. The system of claim 1 wherein the single computational rate is faster than a computer clock cycle rate.

6. The system of claim 5 wherein the velocity rotation compensation is the product of one-half of a sum of a third cross product of the measured angular rotation rate during the first interval and the measured specific force during the first interval minus a fourth cross product of the measured angular rotation rate during the second interval and the measured specific force during the second interval, wherein the summation is calculated over a number of subintervals defined by a fraction of the single computational rate over the computer clock cycle rate.

7. The system of claim 1 wherein the combined velocity rotation compensation and sculling compensation is analytically represented by $(\alpha_{i-1}+\frac{1}{2}\Delta\alpha_i+\frac{1}{12}\Delta\alpha_{i-1})\times\Delta v_i+\frac{1}{12}\Delta v_{i-1}\times\Delta\alpha_i$, wherein $\alpha_{i-1}$ is the measured angular rotation rate during a second interval prior to the first interval, $\Delta\alpha_i$ is a change in the measured angular rotation rate during the second interval, $\Delta\alpha_{i-1}$ is the change in the measured angular rotation rate during the second interval, $\Delta v_i$ is the change in the measured specific force during the first interval, and $\Delta v_{i-1}$ is the change in the measured specific force during the second interval.

8. The system of claim 1, wherein the processor is further configured to determine at least one of a location of the inertial navigation system or a speed of the inertial navigation system based on the first combined velocity rotation compensation and sculling compensation.

9. An apparatus for compensating for sculling error in an inertial navigation system, the apparatus comprising:
    first measuring means for measuring angular rotation rates about and to provide a measured angular rotation rate with components from three orthogonal axes;
    second measuring means for measuring specific forces and to provide a measured specific force with components from three orthogonal axes; and
    processing means for compensating for the sculling error by calculating a sum of a velocity rotation compensation and a sculling compensation at a single computational rate, wherein the sum is of:
        a first cross product of an instantaneous angular rotation rate and a change in the measured specific force over a first interval, wherein the instantaneous angular rotation rate is a sum of the measured angular rotation rates during a second interval prior to the first interval, a fraction of a change in the measured angular rotation rate during the second interval, and a fraction of a change in the measured angular rotation rate during the first interval; and
        a second cross product of a fraction of the change in the specific force over the second interval and the change in the measured angular rate during the first interval;
    wherein the velocity rotation compensation is a change in velocity due to rotational movement of the inertial navigation system and the sculling compensation is a change in velocity due to sculling movement of the inertial navigation system.

10. The apparatus of claim 9 wherein each of the first interval and the second interval is one cycle of the single computational rate.

11. The apparatus of claim 10 wherein the single computational rate is faster than a computer clock cycle rate.

12. The apparatus of claim 11 wherein the velocity rotation compensation is the product of one half times a summation of a third cross product of the measured angular rotation rate during the first interval and the measured specific force during the first interval minus a fourth cross product of the measured angular rotation rate during the second interval and the measured specific force during the second interval, wherein the summation is calculated over a number of subintervals defined by a fraction of the single computational rate over the computer clock cycle rate.

13. The apparatus of claim 9, wherein the processing means is further configured to determine at least one of a location of the inertial navigation system or a speed of the inertial navigation system based on the sum of a velocity rotation compensation and a sculling compensation.

14. A non-transitory processor-readable medium comprising instructions configured to cause a processor to:
    calculate a first cross product of an instantaneous angular rotation rate and a change in a measured specific force over a first interval, wherein the instantaneous angular rotation rate is a sum of a measured angular rotation rate during a second interval prior to the first interval, a fraction of a change in the measured angular rotation rate during the second interval, and a fraction of a change in the measured angular rotation rate during the first interval;
    sum the first cross product with a second cross product of a fraction of the change in the specific force over the second interval and the change in the measured angular rate during the first interval; and
    compute the first cross product and the second cross product at a single computational rate, wherein each of the first interval and the second interval is one cycle of the single computation rate; and compensate for a sculling error using the sum of the first cross product and the second product, wherein;
    the measured angular rotation rate is provided by a set of gyroscopes coupled to the processor and configured to measure angular rotation rates with components from three orthogonal axes; and
    wherein the measured specific force is provided by a set of accelerometers coupled to the processor and configured to measure specific forces with components from three orthogonal axes.

15. The non-transitory processor-readable medium of claim 14, wherein the instructions comprise instructions configured to cause the processor to determine at least one of a location of the processor or a speed of the processor based on the sum the first cross product with a second cross product.

* * * * *